Figure 1:
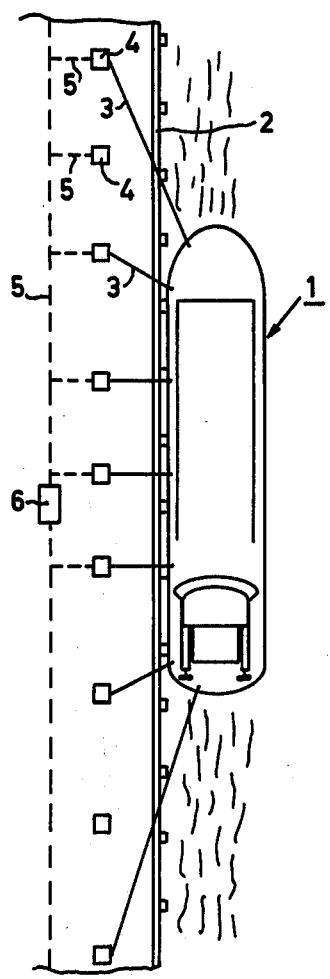

United States Patent [19]

Kooman

[11] 4,165,637

[45] Aug. 28, 1979

[54] FORCE MEASURING DEVICE

[75] Inventor: Willem H. Kooman, Eindhoven, Netherlands

[73] Assignee: U.S. Philips Corporation, New York, N.Y.

[21] Appl. No.: 881,598

[22] Filed: Feb. 27, 1978

[30] Foreign Application Priority Data

Feb. 28, 1977 [NL] Netherlands ............... 7702140
Nov. 24, 1977 [NL] Netherlands ............... 7712971

[51] Int. Cl.² ............................................. G01L 5/10
[52] U.S. Cl. ............................................. 73/141 A
[58] Field of Search ............... 73/88.5 R, 141 A, 143, 73/774; 338/2

[56] References Cited

U.S. PATENT DOCUMENTS

| | | | |
|---|---|---|---|
| 3,576,128 | 4/1971 | Lockery | 73/88.5 R X |
| 3,695,096 | 10/1972 | Kutsay | 73/88.5 R |
| 3,724,575 | 4/1973 | Kutsay | 73/141 A X |
| 3,754,610 | 8/1973 | Paelion et al. | 73/141 A UX |

Primary Examiner—Jerry W. Myracle
Attorney, Agent, or Firm—David R. Treacy

[57] ABSTRACT

A device for transferring a force, comprising a shear-loaded pin for transferring the force, the pin having at least two holes which extend in the longitudinal direction of the pin, the axes of the holes lying in a plane transverse to the main direction in which the force is acting. Strain gauges for measuring the value of the force are provided on the facing inner walls of the holes.

6 Claims, 8 Drawing Figures

FORCE MEASURING DEVICE

The invention relates to a device for the transfer of a force comprising a pin for transferring the force which is shear-loaded and which comprises at least one hole extending in the longitudinal direction of the pin and against the inner wall of which strain gauges are provided for measuring the value of the force.

A device of the above-described type is disclosed in U.S. Pat. No. 3,695,096. In this known device for measuring forces in shear-loaded pins or shafts, the strain gauges are accommodated in a hole in the pin. Since the strain gauges are incorporated in a closed hole, they are readily protected against damage by external influences.

In such devices, the result of the measurement can be remotely observed. It is then known when the forces approach an undesired value and measures can be taken in time. This is of importance, for example, in a mooring device for a ship because, when the forces would become too large, the ship would break from its moorings, with disastrous results.

It is an object of the invention to provide an improvement of the above-described device in that sense that a stronger signal is obtained, that the strain gauges do not suffer too much difference in temperature, and that the device is less sensitive to variations in the direction in which the force acts.

In order to achieve this improvement, the present invention is characterized in that the pin has at least two holes extending in the longitudinal direction of the pin, the axes of the two holes being situated in a plane which is transverse to the main direction in which the force is acting.

According to a preferred embodiment the strain gauges are provided on the facing inner walls of the two holes.

In this manner a device is obtained in which the strain gauges provide a surprisingly much stronger signal than when they are accommodated in only one hole or in holes which are oriented differently with respect to the direction of the force. The sensitivity with respect to variations in the direction of the force also proves to be strongly decreased.

In order to obtain a zone of constantly varying transverse force at the area where the strain gauges are provided, the pin may have a weakening in cross-section at that area.

According to an advantageous embodiment, the weakenings in cross-section of the pin are formed by two diametrically oppositely located grooves extending only over a part of the circumference, these grooves having a depth which decreases gradually towards the ends.

In axes embodiment, the bottom of the grooves may be circular, the diameter of the circle being larger than that of the pin. In this case the weakening in cross-section can easily be provided by clamping the pin eccentrically and then turning the groove.

In another embodiment of the invention, the weakenings in the pin can be obtained by providing a number of bores in the pin the center lines of which extend according to a chord of the circumferential circle of the pin. These weakening bores can also be provided easily.

Because the grooves and bores result in a weakening of the pin which is not desired in certain circumstances, a further embodiment of the present invention in which the device comprises at least two structural parts journalled on the pin is characterized in that at the area of the transition from one structural part to the other, at least one of the structural parts has an inside diameter which exceeds the outside diameter of the pin. In this manner also a zone of the pin is obtained having a constant variation of the transverse force so that a good signal is obtained.

The invention also relates to a pin for use in the above-described force measuring device.

Figure 7:
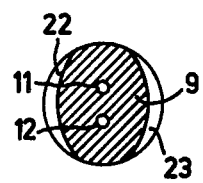
Figure 8:
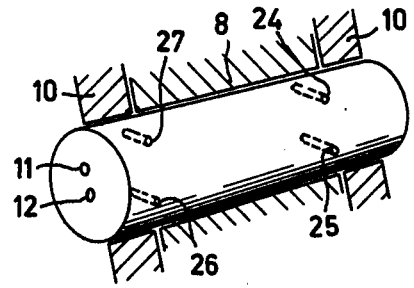
Figure 2:
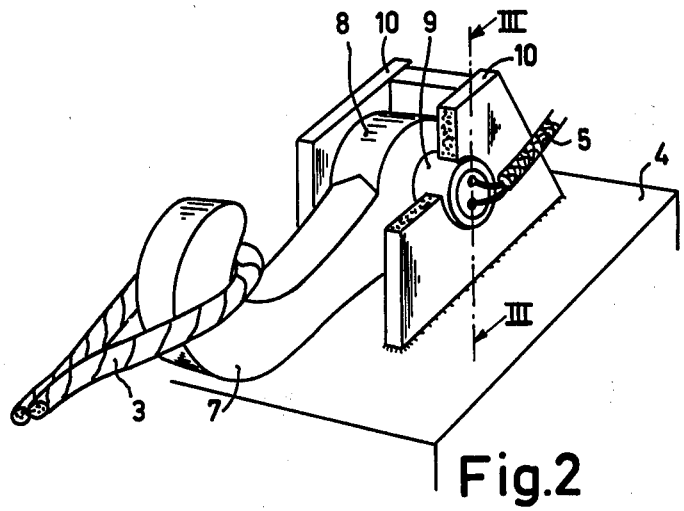
Figure 3:
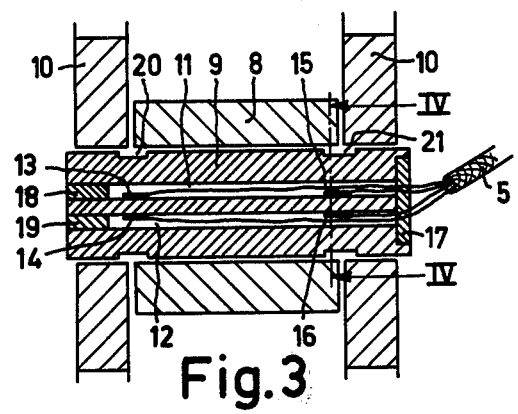
Figure 4:
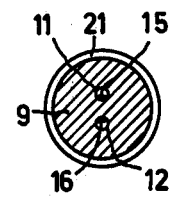
Figure 5:
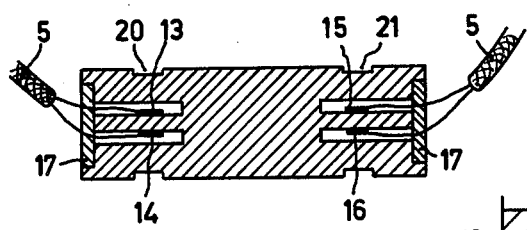
Figure 6:
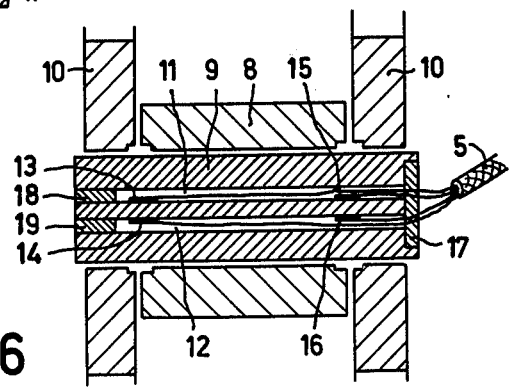

The invention will be described in greater detail with reference to a few embodiments and the accompanying drawing, in which FIG. 1 is a diagrammatic plan view of a ship moored at a quayside, FIG. 2 shows a hook which is coupled to another part by a pin, FIG. 3 is a sectional view taken on the line III—III of a part shown in FIG. 2, FIG. 4 is a sectional view taken on the line IV—IV of the pin shown in FIG. 3, FIG. 5 shows diagrammatically a pin having non-continuous holes on either side, FIG. 6 shows diagrammatically another embodiment of the device, FIGS. 7 and 8 show diagrammatically pins having differently constructed weakenings in cross-section.

In FIG. 1, a ship 1 is moored on a quayside 2 by means of cables 3. On the quayside the cables 3 are connected to mooring posts 4 having hooks 7 which comprise a measuring device according to the invention. Through leads 5 the signal from the measuring device is applied to a central processing and reading station 6. In the station an alarm device may be provided to indicate when the forces start exceeding inadmissible values.

FIG. 2 shows a mooring post 4. The post 4 comprises a hook 7 around which the cable 3 is tied. The actual hook 7 is journalled on a pin 9 by means of an eye-shaped part 8 having an opening in which the pin is inserted. The pin 9 is secured in flanges 10 forming part of the post 4. FIG. 3 is a sectional view of the hook shown in FIG. 2. The pin 9 has two holes 11 and 12 extending in the longitudinal direction of the pin. At the area where the transitions between the flanges 10 and the part 8 are situated, strain gauges 13, 14, 15 and 16 are provided in the holes 11 and 12.

As is also shown in the sectional view of the pin shown in FIG. 4, the strain gauges 13, 14, and 15, 16, respectively, are situated in the neutral line of the pin 9 and against the facing inner walls of the holes 11, 12. The holes 11 and 12 are further arranged so that their axes are situated in a plane which is transverse to the direction in which the force is acting. In order to ensure that the direction of the force does not vary with respect to the pin during operation, the pin may be connected to the part 8 of the hook in any known manner so that the pin cannot rotate with respect to the part 8.

By means of a lead 5 the strain gauges are connected to a measuring instrument, not shown. The holes 11 and 12 are closed at one end by a closing plate 17 while the other end is closed by means of plugs 18 and 19. The strain gauges 13, 14, 15 and 16 are thus fully protected within the pin 9. On the outside the pin 9 has shallow grooves 20 and 21 at the area of the transitions of the flanges 10 to the part 8. Although the depth of the grooves 20 and 21 is the same everywhere in this embodiment, grooves of a different shape may alternatively be used. It is essential only that in some way or another the pin at the area of the transitions of the flanges 10 to the part 8 is positioned freely with respect to the flanges 10 and/or the part 8, so that at that area no transfer of forces takes place and hence a zone of constant transverse force is obtained.

Instead of the grooves having the same depth everywhere, this can also be achieved, for example, by means of the grooves shown in FIG. 7. In the construction shown in FIG. 7 the pin has two pairs of grooves 22 and 23. The grooves are made by clamping the pin eccentrically and then turning the grooves. This results in a circular variation of the bottom of the grooves 22 and 23, the depth of the grooves gradually decreasing from a maximum in the center towards the ends. Due to the reduction in cross-section caused by the grooves 22 and 23, a constant variation of the transverse force in this zone is obtained.

FIG. 8 shows another embodiment of the pin 9. In this case the reductions in cross-section have been obtained by transverse bores 24, 25, 26 and 27. Otherwise the device is constructed in accordance with that shown in FIGS. 2, 3 and 4. By means of the signal provided by the strain gauges 13, 14, 15 and 16, a measure is obtained of the value of the force acting on the pin 9, which again is an indication of the force occurring in the cable 3.

In the embodiment shown in FIGS. 7 and 8 a zone of constant transverse force is obtained by locally reducing the cross-section of the pin. Of course, this results in a local weakening of the pin. In the embodiment shown in FIG. 6 grooves are provided both in the flanges and in the part 8 at the area of the transitions of the flanges 10 to the part 8, so that at these transitions the pin 9 is free from the hook part 8 and the flanges 10. In this manner, no transfer of forces takes place in said areas and again two zones of constant transverse force have been obtained.

By providing the strain gauges 13, 14, and 15, 16 respectively, on the facing inner walls of two holes situated transversely to the direction of the force, a surprisingly large measuring signal is obtained which in addition is little sensitive to variations in the direction of the force. Since the strain gauges are situated rather close together, temperature differences are also small.

Although the holes 11 and 12 in FIG. 3 are continuous holes, non-continuous holes will also suffice, if desired, as is shown diagrammatically in FIG. 5.

What is claimed is:

1. A device for the transfer of a force, comprising a member for applying a force, and having an opening; and a shear-loaded pin inserted in the opening for transferring the force, the pin having at least one hole extending in the longitudinal direction of the pin and strain gauges arranged against the inner wall of the hole for measuring the value of the force, wherein the pin has two holes extending in the longitudinal direction of the pin, the axes of holes being situated in a plane, the pin being oriented with respect to the member so that the plane is transverse to the main direction in which the force is acting, and the strain gauges being disposed on the facing inner walls of the two holes.

2. A device as claimed in claim 1, in which the pin is weakened locally in cross-section at the area of the strain gauges, wherein the weakening in cross-section is formed by two diametrically opposed grooves extending only over a part of the circumference, said grooves having a depth which decreases gradually toward their ends.

3. A device as claimed in claim 2, wherein the bottom of each of the grooves is circular, the diameter of the circular exceeding that of the pin.

4. A device as claimed in claim 1, in which the pin is weakened locally in cross-section at the area of the strain gauges, wherein the weakening is obtained by a number of bores which are provided in the pin, the axes of the bores extending as a chord of the circumferential circle of the pin.

5. A device as claimed in claim 1, comprising at least two force-transferring structural parts journalled on the pin, wherein at the area of the transition from one structural part to the other at least one of the structural parts has an inside diameter exceeding the outside diameter of the pin.

6. A pin suitable for use in a device as claimed in claim 1, wherein the pin has at least two holes extending in the longitudinal direction of the pin and the axes of said holes are situated in a plane which is transverse to the main direction in which the force is acting, and comprising strain gauges disposed on the facing inner walls of the holes.

* * * * *

UNITED STATES PATENT AND TRADEMARK OFFICE
CERTIFICATE OF CORRECTION

PATENT NO. : 4,165,637
DATED : August 28, 1979
INVENTOR(S) : WILLEM HERMANUS KOOMAN It is certified that error appears in the above-identified patent and that said Letters Patent are hereby corrected as shown below:

(Col. 4, line 27)

Claim 3, line 3, change "circular" to --circle--

Signed and Sealed this

Twenty-ninth Day of January 1980

[SEAL]

Attest:

SIDNEY A. DIAMOND

Attesting Officer

Commissioner of Patents and Trademarks